H. F. GRAY.
Assignor by mesne assignments to L. T. STRADER and A. D. FIELD.
WINDOW CORNICE.
No. 10,248. Reissued Nov. 28, 1882.
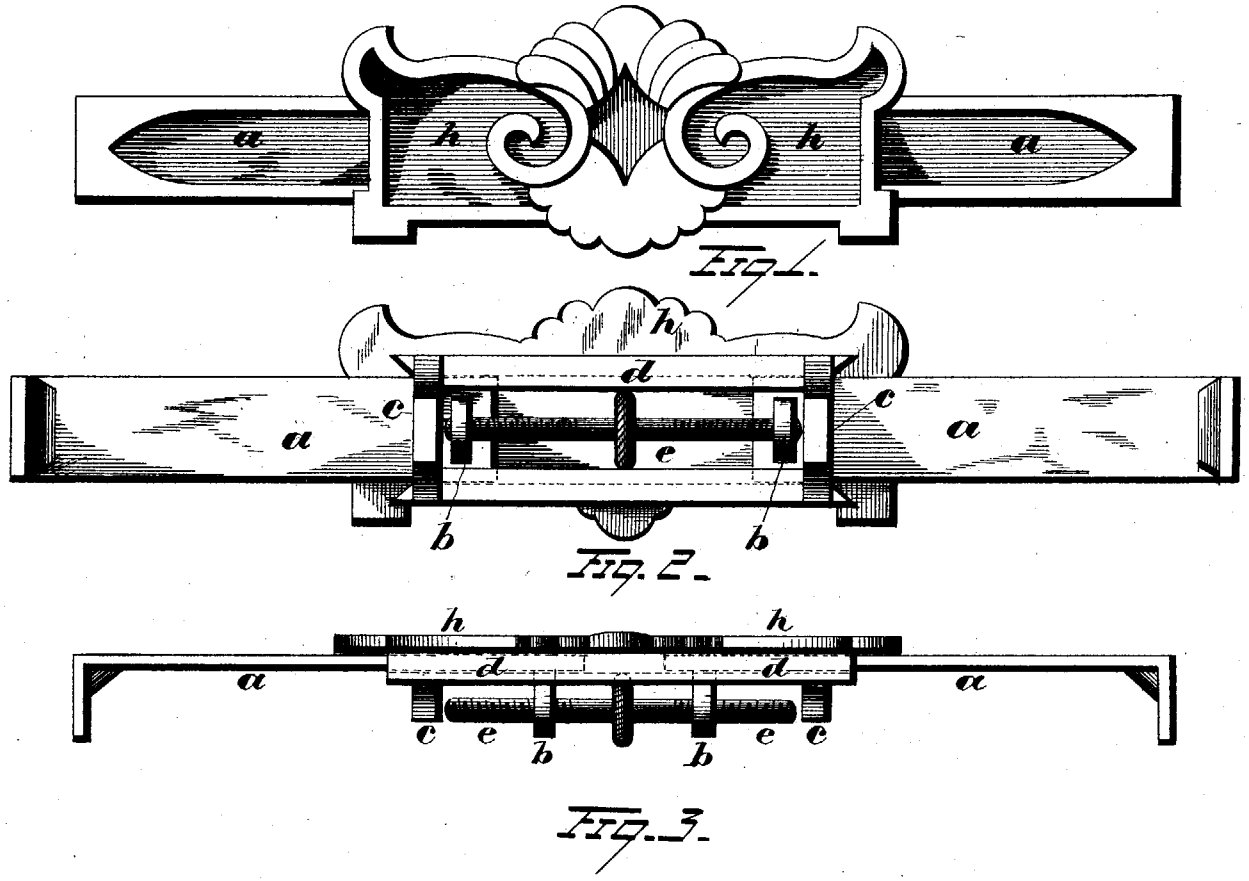
WITNESSES
T. Nottingham
Geo. O. Seymour
INVENTOR
Henry F. Gray
By H. A. Seymour
Attorney
N. PETERS, Photo-Lithographer, Washington, D. C.

UNITED STATES PATENT OFFICE.

HENRY F. GRAY, OF COLUMBUS, OHIO, ASSIGNOR, BY MESNE ASSIGNMENTS, TO LEVI T. STRADER AND ALBERT D. FIELD, OF SAME PLACE.

WINDOW-CORNICE.

SPECIFICATION forming part of Reissued Letters Patent No. 10,248, dated November 28, 1882.

Original No. 228,189, dated June 1, 1880. Application for reissue filed October 6, 1882.

*To all whom it may concern:*

Be it known that I, HENRY F. GRAY, of Columbus, in the county of Franklin and State of Ohio, have invented a new and useful Improvement in Window-Cornices, of which the following is a specification.

The invention relates to inside and adjustable cornices; and it consists of a right-and-left-hand screw-rod, in combination with adjustable arms and other devices, all of which will be understood by the accompanying drawings and description.

In the accompanying drawings, Figure 1 is a front view of my cornice. Fig. 2 is a back view of the same. Fig. 3 is a top view.

In the construction of my cornice the two arms *a a* are arranged to slide in the grooves *d d*, being moved by means of the right-and-left-hand screw-rod *e*, working in nuts or ears *b b* between the stops *c c*, attached to the center-piece *h h*. By this construction the arms *a a* may be easily adjusted to suit the width of different windows without changing the general appearance of the cornice.

I do not broadly claim an adjustable cornice; but I believe the above-described construction of cornice is new, and it is very convenient and useful.

What I claim as new, and desire to secure by Letters Patent, is—

1. In a window-cornice, the combination, with a center-piece, of adjustable arms, a device to simultaneously extend or retract them, and transverse strips attached to the center-piece, at or near the ends thereof, to limit the extension of the arms, substantially as set forth.

2. In a window-cornice, the combination, with a center-piece, of adjustable arms, a right-and-left-hand screw arranged to simultaneously extend or retract them, and devices to limit their extension, substantially as set forth.

3. In a window-cornice, the combination, with a center-piece, of adjustable arms, and a right-and-left-hand screw to adjust said arms, substantially as set forth.

4. In a window-cornice, the combination, with a center-piece, of adjustable arms, nuts secured to the inner ends of the arms, a right-and-left-hand screw, the ends of which enter the said nuts, and devices attached at or near the ends of the center-piece to limit the outward adjustment of the arms, substantially as set forth.

In testimony that I claim the foregoing I hereunto set my hand this 24th day of June, A. D. 1882.

HENRY F. GRAY.

In presence of—
CHAS. E. BURR, Jr.,
GEO. L. ARTZ.